United States Patent Office 3,423,385
Patented Jan. 21, 1969

3,423,385
PROCESS FOR PURIFYING BUTADIENE STREAM
Robert L. Bebb and Edward L. Kay, Akron, Ohio, assignors to The Firestone Tire & Rubber Company, Akron, Ohio, a corporation of Ohio
Filed Sept. 18, 1964, Ser. No. 397,571
U.S. Cl. 260—94.2          6 Claims
Int. Cl. C07c 7/12; C08d 1/14

ABSTRACT OF THE DISCLOSURE

Butadiene and/or isoprene or a hydrocarbon stream containing same plus a hydrocarbon diluent is treated to remove acetylenic impurities, especially vinyl acetylene, ethyl acetylene and/or methyl allene, by agitating such hydrocarbon material in the liquid phase with an immiscible liquid consisting essentially of mercuric sulfate solution containing sulfuric acid. The mixture of the two phases takes place at ambient temperatures. The hydrocarbon phase is then separated and treated to remove carbonyl compounds therefrom, as by distilling the hydrocarbon away from the carbonyl compounds, treating with sodium bisulfite, treating with a solid adsorbent for carbonyl compounds (e.g. alumina, silica or molecular sieves) or by water extraction, or by a combination of any of the foregoing methods. The treatment to remove acetylenic compounds can be carried out as a batch process or as a continuous process.

---

Figure 1:
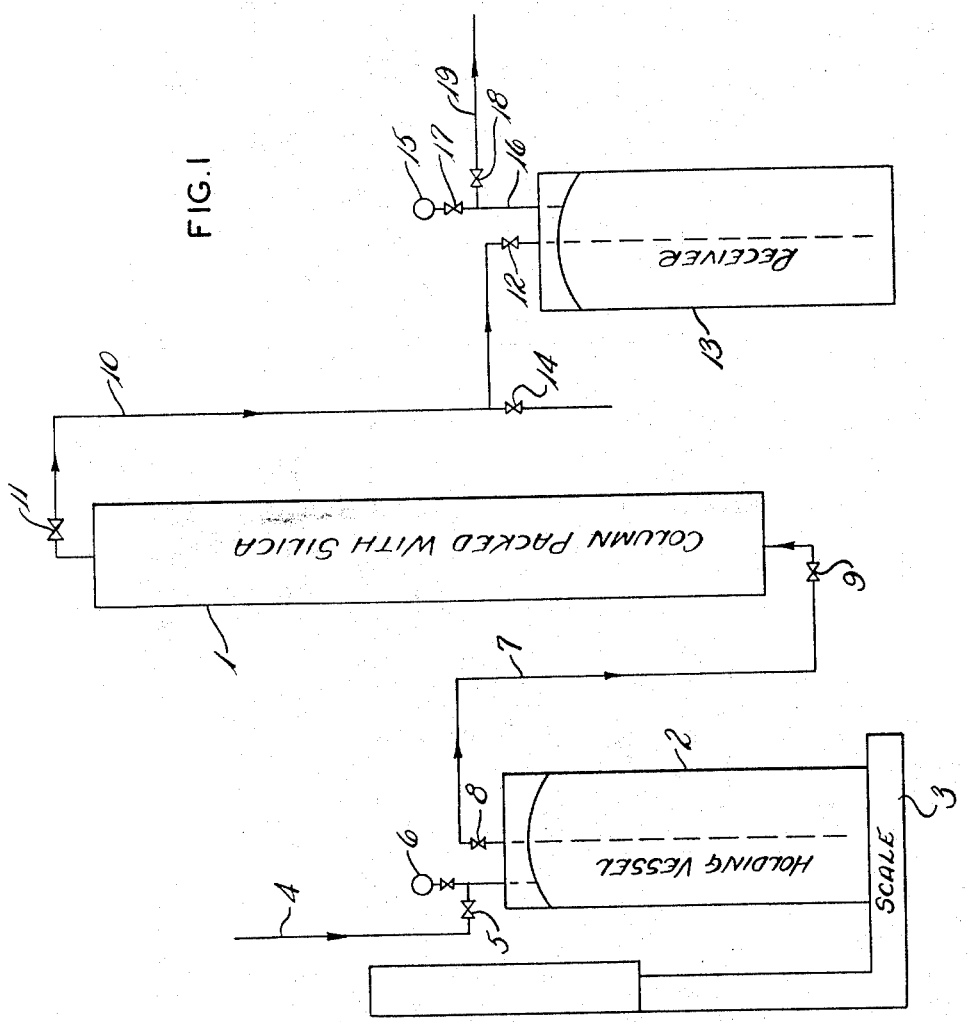

This invention relates to the production of conjugated diolefins containing reduced amounts of acetylenes and allenes and of other impurities.

The recent commercial development of linear, stereospecific rubbery polymers of butadiene–1,3, isoprene and copolymers of butadiene with styrene has created a demand for purer butadiene and isoprene than has been required for the widely practiced emulsion polymerizations. Particularly in the case of polymerizations by means of a lithium catalyst, such as butyllithium, alpa-acetylenes and allenes are undesirables impurities in the diolefin monomers, because they consume polymerization catalyst (and thereby waste the catalyst) and may also seriously lower the cis–1,4-content of the resulting rubbery polymers. In addition, a lithium acetylide, resulting from reaction of a lithium catalyst with an alpha-acetylene impurity, can react with alkyllithiums, including the lithium derivative of a growing polymer chain—which means that during the polymerization process active polymerizing chains can be deactivated, resulting in broadening the molecular weight distribution of the polymer product, with consequent loss of some of the valuable properties of the stereospecific rubber product. Therefore, in the production of the more desirable rubbery polymers it is imperative that the acetylenes be substantially removed from the reaction mixture and not merely neutralized by sacrificial use of catalyst.

The present invention includes the step of treating an impure conjugated diolefin in the liquid phase with aqueous sulfuric acid containing mercuric ions to convert allenes and/or acetylenes (both alpha- and internal-acetylenes), hereinafter sometimes called "acetylenic impurities," present therein to carbonyl compounds. The carbonyl compounds, largely if not entirely ketones, are removed by a suitable treatment, and the purified diolefin is available for polymerization or other desired use.

The impure diolefin monomer is a commercial butadiene–1,3 or isoprene or mixture of these monomers. The diolefin can be mixed with a liquid hydrocarbon diluent, preferably inert to the stereospecific polymerization catalysts, e.g., one or more of the following: butane, isobutane, any butene, pentane, any pentene, any hexane, any hexene, any heptane, any heptene, any octane, any octene, benzene, toluene, any xylene, cyclopentane, methylcyclopentane, cyclohexane, methylcyclohexane, ethylcyclopentane, ethylcyclohexane, cyclopentene, cyclohexene, any methylcyclopentene, any ethylcyclohexene, any methylcyclohexene, any ethylcyclopentene and similar normally liquid hydrocarbons up to and including those containing ten carbons atoms. The impure diolefin can be a hydrocarbon stream containing any appreciable amount of the desired diolefin and produced by a petroleum refining operation, by any of the well-known dehydrogenation processes for producing butadiene and/or isoprene, or from an alcohol by any of the known processes.

The invention can be carried out as a batch process or a continuous process. The hydrocarbon diluent, if employed, can be chosen for convenience in a subsequent polymerization step; for example, the diluent can be petroleum ether or a mixture of benzene and pentane. The concentration of the desired diolefin in any such stream or diluent is not critical, but normally is in the range of 5 to 50 weight percent.

The aqueous treating solution preferably contains mercuric sulfate in the range of 0.2 to 0.6 percent as mercuric oxide; but this range is not critical, and a concentration of 0.005 to 10 percent of mercuric ions (as mercuric oxide) is operable. A suitable concentration of sulfuric acid in the treating solution is 20 weight percent, although 10 to 30 percent $H_2SO_4$ is operable. Deionized water is not required for the treating solution. Ordinary city water or well water is suitable. The treating solution is conveniently prepared by diluting commercial sulfuric acid (93 to 98%) with water to produce approximately 20 percent acid, and then sufficient mercuric oxide is added to provide a concentration of 0.2 to 0.6 percent. After the catalyst solution becomes depleted through use in the invention, it can readily be rejuvenated by the addition of a concentrated solution of $HgSO_4$.

The invention comprises a heterogeneous reaction between the aqueous treating solution and an immiscible liquid phase containing the diolefin and impurities. The aqueous phase and the diolefin phase are mixed by vigorous agitation of the two liquid phases. Such mixing is accomplished by, for example, turbine agitation (by means of a powered rotable shaft carrying one or more propellers) or nozzle-type mixing (as by pumping a mixture of the two phases through a nozzle or orifice or a multiplicity of nozzles or orifices or through a reactor fitted with baffles). The temperature of the two phases is conveniently the ambient temperature, for example, from 40° to 110° F., and usually from 60 to 90° F. The time of treatment varies from about 10 minutes to several hours, depending on a number of factors, including the concentration of acetylenes in the raw diolefin, the desired lower concentration of acetylenes and other impurities in the treated diolefin, the reaction temperature, the concentration of mercuric ions in the treating solution, the volume ratio of treating solution to diolefin phase, the rate of agitation, and other factors. Because the allenes react more slowly with the treating solution than do the acetylenes, removal of a high concentration of allenes from the diolefin phase requires a correspondingly longer treating or reaction time.

The treated diolefin phase is allowed to separate from the denser aqueous treating solution and then is washed with water or a second aqueous treating solution to remove occluded acid and also to remove inhibitor, if present. For this second treating solution it is preferred to use an alkali solution, conveniently a 15 weight percent sodium hydroxide solution (5 to 25 percent NaOH is operable), as this solution satisfactorily removes the usual inhibitor of diolefin polymerization, a tertiary-butylcatechol, when properly mixed with the diolefin phase. This aqueous washing also removes a portion of carbonyls from the treated diolefin phase.

Then the diolefin is separated from the carbonyl compounds by a suitable method. One method involves merely drying the diolefin phase and then distilling the desired diolefin from the carbonyl compounds. Another method makes use of a solution of sodium bisulfite (or of a coating of $NaHSO_3$ on a solid carrier) to absorb the carbonyl compounds, upon appropriately bringing the diolefin phase into contact with such $NaHSO_3$ preparation. Another method involves passing the diolefin phase through a suitable adsorbent for carbonyl compounds, such as alumina, silica or molecular sieves. An additional method effects separation of carbonyls by water or aqueous extraction, that is, by mixing the impure diolefin phase with water or aqueous solution phase, as by countercurrent flow through a wash tower. The preferred commercial method for removing carbonyls is by adsorption, as by means of silica, from the liquid diolefin phase and/or by distillation.

The invention is further illustrated by the following examples, in which all parts are by weight unless otherwise indicated.

EXAMPLE 1

A portion of a raw C4 hydrocarbon stream, containing C4 saturates (n-butane and isobutane), mono-olefins, butadiene-1,3 and objectionable impurities (such as ethylacetylene, vinylacetylene and methylallene) was mixed in the liquid phase by agitation at 30° C. with an acidified ($H_2SO_4$) aqueous solution of mercuric acetate. The reaction mixture was allowed to separate into two liquid layers. The lower, aqueous layer was removed and set aside. The upper, hydrocarbon layer was washed with water, by agitation, to remove some of the carbonyl compounds and then flash-distilled for separation from the remainder of the carbonyl compounds. The distillate was analyzed by gas chromatography, and no evidence for either ethyl- or vinylacetylene was found. The methylallene content of the hydrocarbon stream was also significantly lowered by this treatment.

EXAMPLE 2

A continuous process experiment was carried out to study the effectiveness of acetylene removal by the liquid phase aqueous mercuric sulfate treatment of the invention. Two five gallon stainless steel reactors and a six-foot, glass-lined wash tower were the principal pieces of equipment used. From a storage tank liquid commercial (impure) butadiene was pumped to the first reactor (the mixer) equipped with a motor driven stirrer. At the same time an aqueous mercuric sulfate catalyst solution (0.2% mercuric oxide in 20% sulfuric acid) was pumped at an equal rate into the mixer from the bottom of the second reactor (the settler). The mixture of approximately equal volumes of liquid commercial butadiene and catalyst solution were agitated in the mixer by operation of the stirrer, for an average contact time of 24 minutes for the two phases. The stirred mixture was then forced from the mixer through a pipe to the settler, where it separated into an upper butadiene layer and a lower catalyst solution layer. The separated butadiene liquid was allowed to flow through a pipe to the bottom of the wash tower. The lower catalyst layer in the settler was ready for recycling to the mixer. The butadiene stream from the settler was washed by a countercurrent flow of water through the wash tower. The washed butadiene flowed from the top of the wash tower to a storage tank.

The continuous run of this Example 2 extended throughout a 48 hour period, during which time approximately 200 gallons (approximately 5 gallons per hour) of commercial butadiene were treated. The butadiene and catalyst flow rates were regulated at five gallons per hour. Samples of treated butadiene were taken from time to time and analyzed for ethyl- and vinyl-acetylenes. The entire operation was conducted at ambient temperatures in a pilot plant in the late spring in Akron, Ohio. Results expressed in parts per million (p.p.m.) are given in Table 1, in which butadiene is designated "BD."

TABLE 1

| | Pounds of Commercial BD Treated | Acetylenes (p.p.m.) | | |
|---|---|---|---|---|
| | | Ethyl | Vinyl | Total |
| Commercial BD | | 311 | 327 | 638 |
| Treated BD Hours on Stream: | | | | |
| 1.75 | 45.7 | 40 | 60 | 100 |
| 4.75 | 124 | 20 | 45 | 65 |
| 8.75 | 228 | 30 | 90 | 120 |
| 13.0 | 339 | 60 | 180 | 240 |
| 19.0 | 496 | 45 | 75 | 120 |
| 27.0 | 705 | 50 | 100 | 150 |
| 36.5 | 953 | 50 | 90 | 140 |
| 40.0 | 1,044 | 30 | 60 | 90 |

Commercial isoprene can also be purified in an analogous manner to lower the acetylene content substantially.

EXAMPLE 3

The viscosity and yield of rubbery polybutadine obtained by polymerizing samples of the commercial (impure) butadiene employed in Example 2 and of the composite treated butadiene of that example are listed in Table 2. These data substantiate the analytical results, which show that the mercuric sulfate treatment of the invention with subsequent removal of carbonyl compounds reduces the impurity level to practical limits. The polymerization catalyst requirement is reduced from substantially more than 0.012 gram of carbon-bound lithium (butyllithium catalyst in inert hydrocarbon solvent) per 100 grams of butadiene for the commercial butadiene to approximately 0.006 gram of carbon-bound lithium per 100 grams of the so-purified butadiene, for production of a commercially acceptable viscosity polymer, and the yield of polymer is substantially improved.

TABLE 2

| Butadiene Polymerized | Polymerization Catalyst Level (gm. C-Li/100 gm. BD) | Inherent Viscosity | Percent Yield of Polymer |
|---|---|---|---|
| Commercial BD | 0.008 | | 0.0 |
| | 0.010 | 2.37 | 23.4 |
| | 0.012 | 3.96 | 82.0 |
| Composite Purified BD | 0.004 | 4.77 | 98.8 |
| | 0.006 | 2.48 | 99.2 |
| | 0.008 | 1.87 | 99.4 |

EXAMPLE 4

Experiments were conducted to determine the effectiveness of removing carbonyl compounds from a commercial grade of butadiene which had been treated with mercuric sulfate catalyst in accordance with the invention, by percolation through a mass of adsorbent material. Reference is made to FIG. 1 of the drawings for a diagrammatic view of the equipment utilized. The adsorbent, a commercial active silica, was contained in a 76 inch vertical, jacketed column 1. For convenience in handling and also to minimize undesirable polymerization of butadiene upon contacting the silica, a portion of butadiene which had been treated with aqueous mercuric sulfate as in Example 1 was mixed with three parts of commercial hexane in a Fram pressure cylinder 2, placed for convenience on a weighing scale 3. Nitrogen under pressure was supplied to a pipe 4 and allowed to flow through a valve 5 to cylinder 2, which functionated also as a holding vessel for the carbonyl-containing butadiene. The holding vessel was equipped with a pressure gauge 6. A pipe 7, provided with valves 8 and 9 connected the holding vessel 2 to column 1.

In order to treat the butadiene-hexane blend for removal of carbonyls and any water present, nitrogen was pressured into the holding vessel 2, and valves 8 and 9 were opened to allow the blend to flow into the bottom of column 1 and to percolate upwardly through the silica contained therein. The purified blend flowed from column 1 through a pipe 10 and valves 11 and 12 to a second Fram pressure cylinder 13, which functionated as a receiver for storing the purified butadiene-hexane blend. A valve 14 allowed the blend to be sampled. As the purified blend flowed into receiver 13, the gas pressure therein increased and was measured by a gauge 15 connected to the receiver by a pipe 16 and a valve 17. The gas pressure in the receiver was controlled to the desired storage pressure by a valve 18, connected to a vent (not shown) through a pipe 19.

Two batch percolation experiments were conducted. In the first experiment, approximately 100 pounds of the 75/25 hexane/butadiene blend were percolated through column 1 at a rate of 38.2 pounds per hour per cubic foot of silica in the column. Samples were taken every hour, and a sample of the composite batch was taken after several hours.

For the second experiment, approximately 100 pounds of the blend were percolated at a rate of 76.4 pounds per hour per cubic foot of silica. Samples were taken every half hour, and a sample of the composite batch was also taken at the end of the run. The two experimental batches of the blend were successively percolated through the identical silica adsorbent without regeneration. Results of both experiments are given in Table 3, in which the carbonyls are reported in parts per million as acetone.

and butadiene-1,3, can be substantially purified from acetylenic impurities by treatment with aqueous $HgSO_4$, and then by contact with silica or alumina adsorbents to remove carbonyls, as described herein with reference to butadiene alone.

EXAMPLE 5

A series of batch experiments was carried out to determine optimum conditions. A five gallon stainless steel reactor was used. The commercial butadiene and aqueous $HgSO_4$ solution were separately charged to the reactor, a bomb being used to charge the liquid butadiene. The system was stirred in the reactor and then allowed to settle. After the catalyst was removed, water washes were added, agitated with the butadiene layer, and removed until neutrality was obtained. Seven batch experiments were run. The contact time of butadiene with catalyst solution was usually 90 minutes, although samples were also taken for analysis at 15, 30 and 60 minutes. The weight percent of HgO used was varied from 2.0 to 0.02, and the volume ratio of butadiene to catalyst solution was varied from 1:1 to 20:1. All but one run were carried out at ambient temperature. Results are shown in Tables 4 and 5. "VA" and "EA" in Table 4 signify vinylacetylenes and ethylacetylenes, respectively.

TABLE 4

| Exp. No. | Volume Ratio BD/HgSO4 | Percent HgO | Temperature | | Acetylenes (p.p.m.) After Minutes of Contact | | | | | Minutes of Contact |
|---|---|---|---|---|---|---|---|---|---|---|
| | | | | | 0 | 15 | 30 | 60 | 90 | |
| 1 | 1:1 | 2.0 | Ambient | VA | | | | | | 60 |
| | | | | EA | 500 | 50 | | 20 | | |
| 2 | 10:1 | 2.0 | do | VA | 300 | 225 | 165 | 60 | | 60 |
| | | | | EA | | | | | | |
| 3 | 20:1 | 2.0 | do | VA | 300 | | | 120 | 75 | 90 |
| | | | | EA | | | | | | |
| 4 | 20:1 | 2.0 | 50° C | VA | 300 | | | 30 | 30 | 90 |
| | | | | EA | | | | | | |
| 5 | 1:1 | 0.2 | Ambient | VA | 300 | 50 | 30 | 30 | | 90 |
| | | | | EA | | | | | | |
| 6 | 1:1 | 0.2 | do | VA | 300 | 75 | 0 | | | 90 |
| | | | | EA | 300 | 20 | 0 | | | |
| 7 | 1:1 | 0.02 | do | VA | 300 | 200 | 195 | 150 | 70 | 90 |
| | | | | EA | 300 | 72 | 50 | 20 | 0 | |

TABLE 3

| | Hours after Start of Percolation | Weight in Pounds of Blend Percolated | Carbonyl Analysis, p.p.m. |
|---|---|---|---|
| Experiment No.: | | | |
| 1 | 0 | 0 | 119 |
| 1 | 1 | 18.25 | <5 |
| 1 | 2 | 39.25 | <5 |
| 1 | 3 | 59.25 | <5 |
| 1 | (¹) | 62.75 | <5 |
| 1 | 4.25 | 80.5 | <5 |
| 1 | 4.5 | 95.75 | <5 |
| 2 | 0 | 0 | 157 |
| 2 | 0.5 | 25.75 | <5 |
| 2 | 1 | 58.5 | <5 |
| 2 | 1.5 | 75.25 | <5 |
| 2 | 2 | 96.75 | <5 |
| 2 | (²) | 96.75 | <5 |

¹ Composite after 3.25.
² Composite.

The experiments of Example 4 demonstrate the ease and efficiency of removing carbonyls by adsorption on silica from a liquid butadiene previously treated with aqueous $HgSO_4$ to reduce the content of acetylenes and allenes. Similar results are obtained upon substituting the silica by a commercial active alumina, e.g., a desiccant type of alumina. Used adsorbent (silica or alumina) is readily reactivated by being heated in a vacuum (e.g., a commercial steam-jet vacuum) to ca. 375° F., in a manner well known in the art.

Likewise, a commercial isoprene, treated with aqueous $HgSO_4$ in accordance with the invention, can be efficiently separated from carbonyls by the techniques of Example 4. In the same manner, a commercial mixture of isoprene Table 5 shows analyses for carbonyls as p.p.m. of acetone, initially, after water-washing, and then after flash-distilling the butadiene. A 75/25 hexane/butadiene blend was then made up and percolated through active alumina, and a carbonyl analysis was run on the resulting purified butadiene-hexane blend. It may be noted that the precision of this analysis was approximately 5 p.p.m.

TABLE 5

| | Carbonyls in p.p.m. | | | |
|---|---|---|---|---|
| | Initial | Water-Washed | Flash-Distilled | Purified Blend |
| Experiment No.: | | | | |
| 1 | | 260 | 5 | <5 |
| 2 | 350 | 175 | 17 | 10 |
| 3 | 520 | 250 | 20 | <5 |
| 4 | 000 | 465 | 35 | <5 |
| 5 | 235 | | 5 | <5 |
| 6 | 485 | 225 | 30 | <5 |
| 7 | 575 | 235 | 32 | <5 |

EXAMPLE 6

Figure 2:
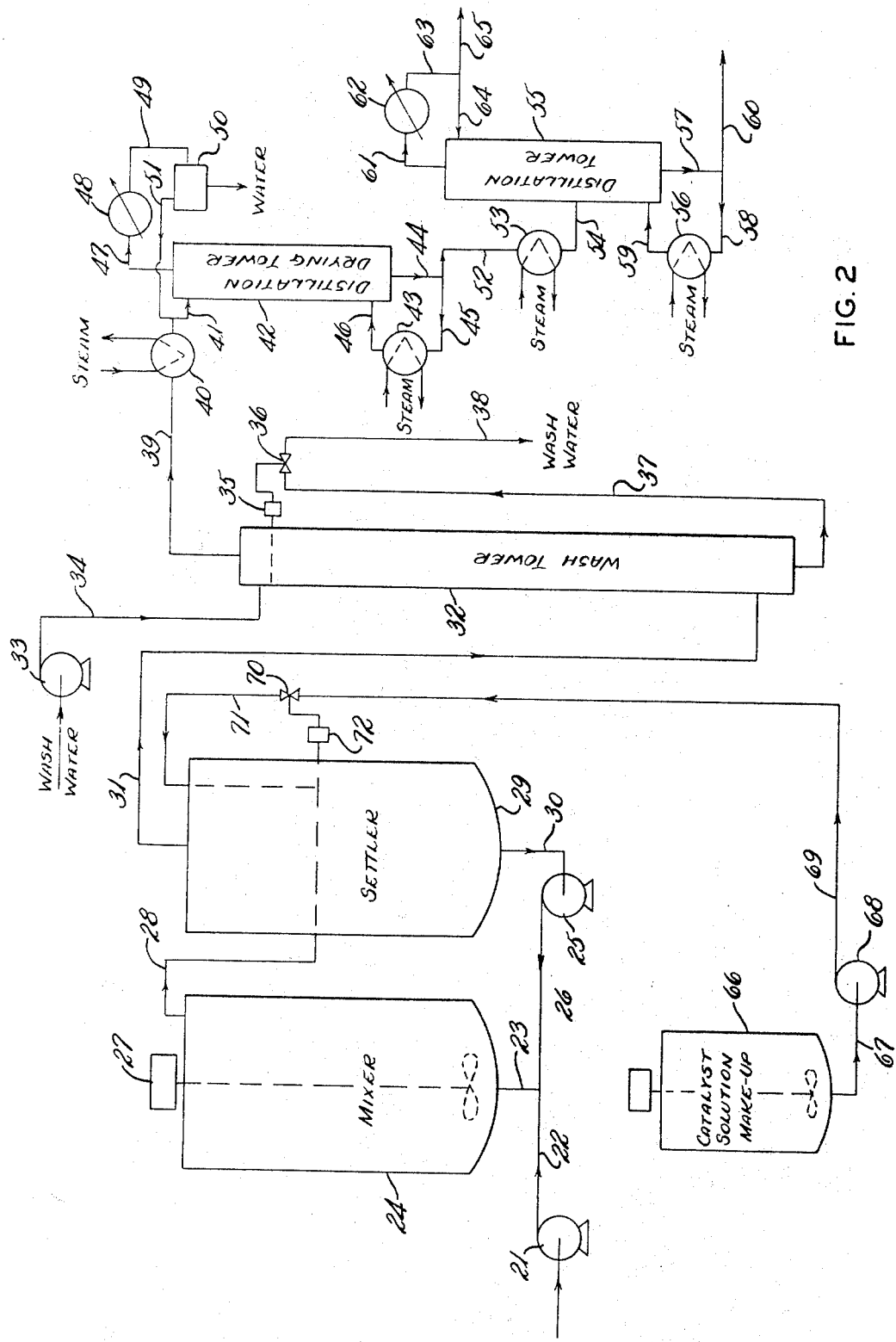

Continuous operation of the purification process of the invention can be carried out in apparatus shown diagrammatically in FIG. 2. Commercial butadiene is fed by a pump 21 (suitably a centrifugal pump) through pipes 22 and 23 to a mixing vessel 24, at a rate of 50 gallons per minute. At the same time, a catalyst solution as in Example 2 is fed by a pump 25 (suitably a centrifugal pump) through pipes 26 and 23 to vessel 24. An agitator 27 functions to mix the two phases, and the mixture flows at a rate of 100 gallons per minute, through a pipe 28 to near the middle portion of a settling vessel 29. The denser catalyst solution separates to the bottom of settler 29 and flows through a pipe 30 to pump 25 and thence to the mixer 24. The butadiene rises to the top of settler 29 and flows through a pipe 31 to a position near the bottom of a wash tower 32. Wash water (or alternatively 15 percent NaOH solution) is fed by a pump 33 through a pipe 34 to a position near the top of wash tower 32. As the water descends through tower 32 it contacts and washes the less dense butadiene as the latter rises to the top of the tower. The wash water level in tower 32 is maintained near the top by a liquid level control device 35, connected to a three-way valve 36, also connected to a wash water exit pipe 37 and a discharge pipe 38. Butadiene flows from the top of wash tower 32 through a pipe 39 to a steam-heated vessel 40 where it is flash-distilled through a pipe 41 to a distillation drying tower 42. A second steam-heater 43 vaporizes butadiene condensate flowing from the bottom of tower 42 through pipes 44 and 45, the vaporized butadiene re-entering tower 42 near the bottom thereof through a pipe 46. An azeotrope of water and butadiene passes from the top of tower 42 through a pipe 47 to a condenser 48, and the condensate flows through a pipe 49 to a separator 50, from which the lower layer of water is discarded and the upper butadiene layer is returned by a pipe 51 to join the butadiene being fed into the top portion of tower 42 through pipe 41. Substantially dry butadiene flows from the bottom of tower 42 through pipes 44 and 52 to a steam-heater 53. Vaporized butadiene from heater 53 flows through a pipe 54 to a distillation tower 55, provided with an additional steam-heater 56 for vaporizing butadiene from the bottoms flowing through pipes 57 and 58. Vapor re-enters the bottom portion of tower 55 through a pipe 59, and condensed carbonyls are discarded through a pipe 60. Vapor from the top of distillation tower 55 flows through a pipe 61 to a condenser 62, from which the reflux returns to the top of tower 55 through pipes 63 and 64. Purified butadiene is taken off through a pipe 65.

As the catalyst gradually becomes depleted, fresh catalyst is made up in a vessel 66 by dissolving HgO in 20 weight percent $H_2SO_4$ to produce a concentrated solution of $HgSO_4$, and this solution is fed through a pipe 67 to a pump 68 and a pipe 69 to a valve 70, whence the make-up catalyst solution is added through a pipe 71 to the interior of settler 29. Valve 70 is also connected to a liquid level device 72. Suitable means (not shown) for separating metallic mercury are desirably provided near the bottom region of settler 29, as it is advantageous to remove same in order to prevent accumulations of sludge in the mixing and settling regions and also to allow reclaiming the valuable mercury for reuse in the process or for other purposes.

EXAMPLE 7

Figure 3:
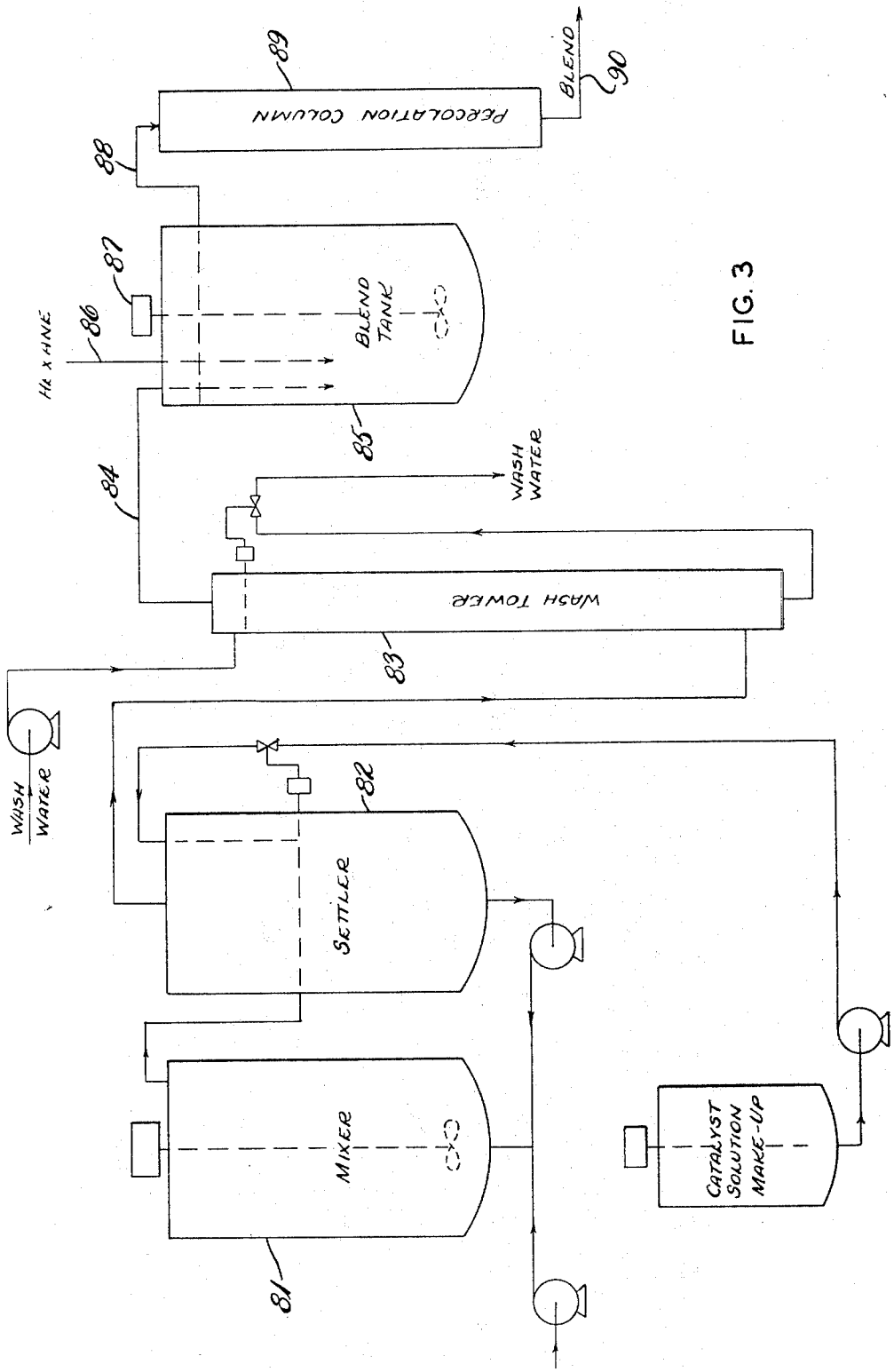

Alternative apparatus for purifying butadiene in accordance with the invention is shown diagrammatically in FIG. 3, wherein a mixer 81, a settler 82, a wash tower 83 and the accompanying connections and apparatus shown are equivalent in functions to mixer 24, settler 29, wash tower 32 and coacting members shown in FIG. 2 and described in Example 6. Washed butadiene flows from the top of wash tower 83 through a pipe 84 to a blend tank 85, suitably a presure vessel, for blending with an inert solvent, e.g., hexane, which is supplied through a pipe 86 to tank 85. Mixing is accomplished by moderate agitation, suitably provided by a conventional stirrer 87. The blend, suitably 75 parts hexane to 25 parts butadiene, flows from tank 85 through a pipe 88 to a percolation column 89, packed with a suitable adsorbent for carbonyls contained in the butadiene fed thereto, e.g., with a dessicant grade of silica or alumina, active charcoal or molecular sieves. Ordinarily silica packing is chosen for reasons of efficiency and economy. Water is also removed by the packing in column 89. The purified blend leaves column 89 through a pipe 90. It is particularly suited for direct use in polymerizations to produce a stereospecific synthetic rubber by contact with a suitable catalyst.

Suitable lithium catalysts for polymerizing the so-purified butadiene (and/or isoprene) to stereospecific synthetic rubbers, including copolymerizing either or both purified diolefin monomer with styrene or other arylolefin monomer are disclosed in British Patents 813,198 and 817,693, the relevant disclosures of which patents are incorporated herein by reference. Regular or uniform copolymers of butadiene and/or isoprene with styrene or other arylolefin monomer can be produced by means of a lithium catalyst in accordance with the disclosure in Belgian Patent 634,869, and said disclosure is incorporated herein by reference. The present invention extends to the polymerization by any of the techniques disclosed in these three reference patents of one or more purified conjugated diolefin monomer preparations as disclosed herein, whether as a purified diolefin monomer alone, a purified mixture of diolefin monomers or a purified blend of an inert hydrocarbon solvent and one or more diolefin monomers. The resulting synthetic rubber products are more uniform in properties, and in some respects possess superior properties, as compared with the synthetic rubbers described in the three reference patents referred to above.

EXAMPLE 8

A large scale experimental run was conducted to demonstrate the process of the invention. Apparatus similar to that shown in FIG. 3 and described in Example 7 was utilized. Thereby the acetylene level of several million pounds of commercial butadiene was reduced from an average of 350 parts per million to a range of 40 to 80 p.p.m. This purification of the butadiene also resulted in a reduction in the amount of lithium catalyst required to produce a commercially acceptable rubbery polymer from the butadiene, amounting to a reduction of 0.015 to 0.030 part by weight of alkyllithium per 100 parts of butadiene monomer. The rubbery product of this example also possessed more uniform properties and was obtained in higher yields than had been obtained by analogous polymerizations of the commercial butadiene not purified in accordance with the invention.

The synthetic rubber products of the invention, i.e., those produced by lithium polymerizations of butadiene and/or isoprene purified as described herein, are superior to analogous polymers produced by lithium polymerizations from butadiene and/or isoprene not so purified. The superiorities include relatively narrower molecular weight distribution, and higher 1,4-content with consequently less vinyl structure. The polymers of the invention are further characterized by lack of gel and low hysteresis properties. The process of the invention insures production of the rubbery polymers in substantially quantitative yields. Also, in cases involving lithium polymerizations of isoprene purified in accordance with the invention, the resulting rubbery polymers possess higher cis-1,4 microstructures than analogous polymers made from the unpurified isoprene.

The polymers produced in accordance with the invention are useful in all rubber products, either as the sole rubber employed or in blends with each other, with natural rubber, with conventional emulsion SBR or any other compatible rubbery polymer. The novel polymers can be extended with oil or other plasticizers to the extent of 10 to 100 phr. of plasticizer, or more, in the manners known to the art for extending SBR and polybutadiene rubbers, with or without admixture with natural rubber or with each other. Likewise, the polymers of the invention can be stabilized against deterioration caused by heat, air, ozone or any other known enemy of a rubber by the inclusion in the polymers of any stabilizer known to be effective in similar rubbery polymers. Additionally, the novel polymers can be vulcanized, reinforced (as by means of carbon black), filled, compounded and processed into commercially useful products in any manner known to be useful with natural rubber and other general purpose synthetic rubbers. The polymers produced in accordance with the invention are especially suited for use in tread compositions for pneumatic tires, either in treads of new tires or in camelback; blends of the novel polymers with natural rubber and/or with emulsion SBR are practical rubbers for such tire treads.

We claim:

1. Process of purifying commercial butadiene containing as impurities ethylacetylene, vinylacetylene or methylallene, comprising admixing the butadiene in the liquid phase with approximately an equal volume of aqueous liquid consisting essentially of mercuric sulfate solution containing sulfuric acid, agitating the two liquid phases at ambient temperatures into intimate contact with each other to convert at least a portion of said impurities to largely ketone carbonyl compounds, separating the butadiene phase and intimately contacting said phase with an alkaline aqueous wash liquid to neutralize acidic material in said phase and to remove some carbonyl compounds therefrom separating the washed butadiene liquid phase, admixing the same with at least an equal volume of a liquid hydrocarbon diluent inert to stereospecific polymerization catalysts to form a liquid blend, and contacting the blend with adsorbent silica to remove a substantial proportion of said carbonyl compounds from the blend.

2. The process of claim 1 in which the diluent is hexane.

3. The process of claim 1 in which the washed butadiene is flash-distilled prior to admixing with hydrocarbon diluent.

4. The process of claim 1 in which the various steps are carried out continuously.

5. Method of producing an improved stereospecific rubbery butadiene polymer, comprising polymerizing by means of a lithium catalyst a butadiene purified in accordance with claim 1.

6. Process of removing impurities consisting essentially of ethylacetylene, vinylacetylene or methylallene from a hydrocarbon stream containing a liquid hydrocarbon diluent and butadiene, comprising admixing said stream in the liquid phase with aqueous liquid consisting essentially of mercuric sulfate solution containing sulfuric acid, agitating the two liquid phases at ambient temperatures into intimate contact with each other to convert a portion of the impurities to largely ketone carbonyl compounds, separating the hydrocarbon phase, and contacting the latter with adsorbent silica to remove a substantial proportion of said carbonyl compounds from the hydrocarbon phase.

References Cited

UNITED STATES PATENTS

| | | | |
|---|---|---|---|
| 1,151,928 | 8/1915 | Duden et al. | 260—681.5 |
| 3,209,050 | 9/1965 | Hanson | 260—681.5 |
| 2,543,478 | 2/1951 | Tooke et al. | 202—57 |
| 3,281,489 | 10/1966 | Goering | 260—681.5 |

FOREIGN PATENTS

| | | |
|---|---|---|
| 570,650 | 7/1945 | Great Britain. |
| 1,196,641 | 7/1965 | Germany. |

OTHER REFERENCES

Adsorption by Mantell (Chem. Eng. Series), 2nd edition, 1951, pp. 97 and 180.

JOSEPH L. SCHOFER *Primary Examiner.*

W. F. HAMROCK, *Assistant Examiner.*

U.S. Cl. X.R.

260—94.9, 94.3, 605, 681.5

UNITED STATES PATENT OFFICE
CERTIFICATE OF CORRECTION

Patent No. 3,423,385

January 21, 1969

Robert L. Bebb et al.

It is certified that error appears in the above identified patent and that said Letters Patent are hereby corrected as shown below:

Column 1, line 41, "alpa" should read -- alpha --. Column 2, line 10, "carbons" should read -- carbon --. Columns 5 and 6, TABLE 4, second column, line 4 thereof, "20;1" should read -- 20:1 --. Column 9, line 22, "therefrom" should read -- therefrom, --.

Signed and sealed this 31st day of March 1970.

(SEAL)

Attest:

Edward M. Fletcher, Jr.

Attesting Officer

WILLIAM E. SCHUYLER, JR.

Commissioner of Patents